United States Patent
Harms et al.

(10) Patent No.: US 10,018,720 B1
(45) Date of Patent: Jul. 10, 2018

(54) ADAPTIVE OPTICAL SENSOR FOR CONTAINER PRESENCE AND MOTION

(71) Applicant: GOODRICH CORPORATION, Charlotte, NC (US)

(72) Inventors: Scott Harms, Ypsilanti, ND (US); Justin D. Williams, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 31 days.

(21) Appl. No.: 15/382,209

(22) Filed: Dec. 16, 2016

(51) Int. Cl.
*G01B 11/14* (2006.01)
*G01S 17/02* (2006.01)
*G01V 8/12* (2006.01)
*G01S 17/88* (2006.01)
*G01S 17/10* (2006.01)
*G01S 7/481* (2006.01)
*B64C 1/22* (2006.01)
*B64C 1/20* (2006.01)
*B64D 9/00* (2006.01)

(52) U.S. Cl.
CPC .............. *G01S 17/026* (2013.01); *B64C 1/20* (2013.01); *B64C 1/22* (2013.01); *G01B 11/14* (2013.01); *G01S 7/4813* (2013.01); *G01S 17/10* (2013.01); *G01S 17/88* (2013.01); *G01V 8/12* (2013.01); *B64D 2009/006* (2013.01)

(58) Field of Classification Search
CPC ... G01N 2035/0425; G01N 2035/0494; G01N 21/35; G01B 11/14; G01B 11/005; G01B 15/00; G01B 11/026; G01B 11/00; G01C 3/08; G01C 3/32; G02B 7/32; G01P 13/00; G02F 1/29
See application file for complete search history.

(56) References Cited

U.S. PATENT DOCUMENTS

| | | | |
|---|---|---|---|
| 4,198,164 A * | 4/1980 | Cantor | B61K 9/08 250/202 |
| 7,199,543 B1 * | 4/2007 | Hettwer | B64D 9/00 198/781.01 |
| 8,768,608 B2 | 7/2014 | Scherenberger et al. | |
| 2008/0078867 A1 * | 4/2008 | Milender | B65G 13/065 244/118.1 |
| 2009/0121084 A1 * | 5/2009 | Hettwer | B64D 9/00 244/137.1 |
| 2009/0121085 A1 * | 5/2009 | Hettwer | B64D 9/00 244/137.1 |
| 2012/0101636 A1 | 4/2012 | Huber et al. | |
| 2012/0206336 A1 * | 8/2012 | Bruder | G01B 11/026 345/156 |

(Continued)

*Primary Examiner* — Michael P Stafira

(57) ABSTRACT

A unit load device (ULD) sensor for detecting presence and movement of cargo within an aircraft includes a light source designed to generate light as pulses with pulse intervals between the pulses and having a source lens designed to focus the light towards a first point that is a first distance away from the source lens. The ULD sensor also includes a light receiver having a light detector designed to receive a reflection of the light and a receiver lens designed to focus the reflection of the light towards a second point that is towards the light detector and a second distance away from the receiver lens. The second distance is different than the first distance and the detected reflection of the light is usable to determine the presence and the movement of the cargo.

18 Claims, 14 Drawing Sheets

(56) References Cited

U.S. PATENT DOCUMENTS

2013/0100438 A1* 4/2013 Breuer .................... G01P 13/00
356/51
2016/0171776 A1* 6/2016 Bridges .............. H04N 13/0203
348/47

* cited by examiner

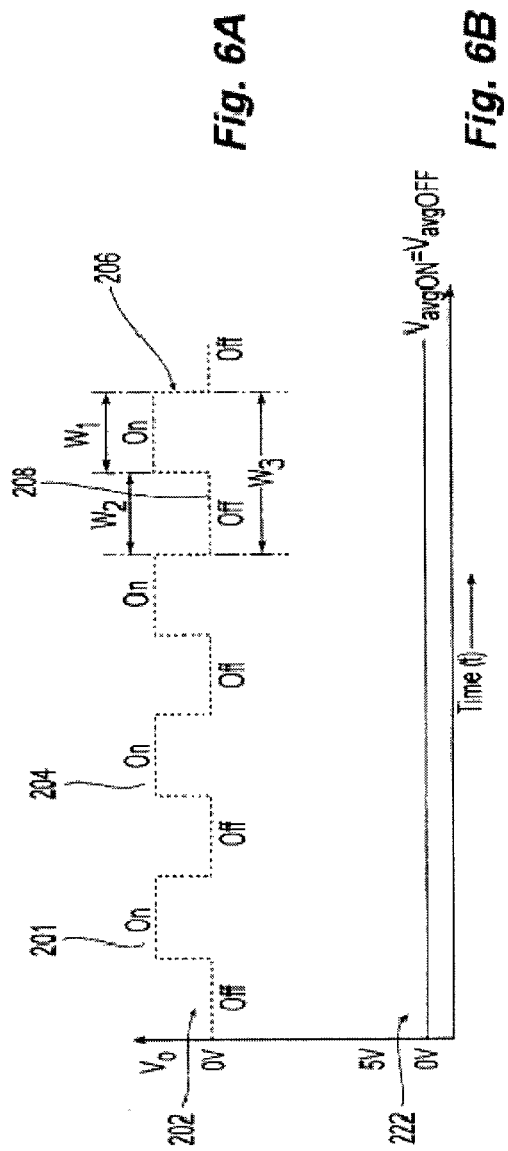

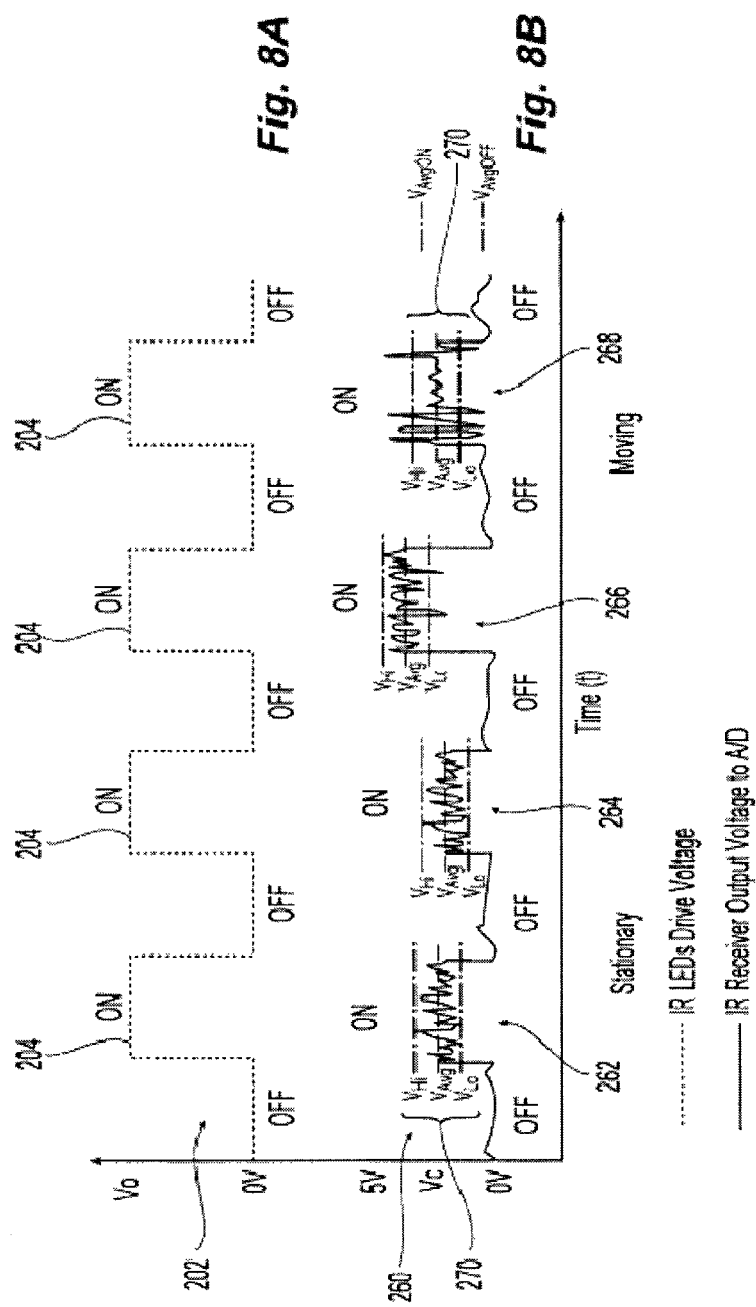

264

268

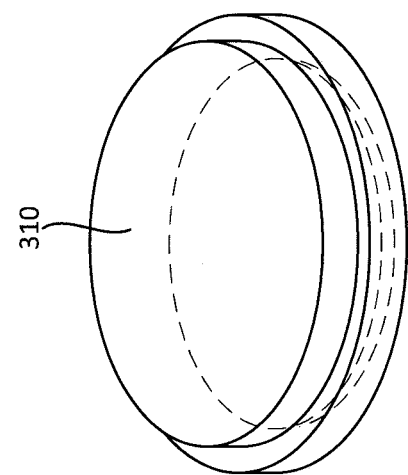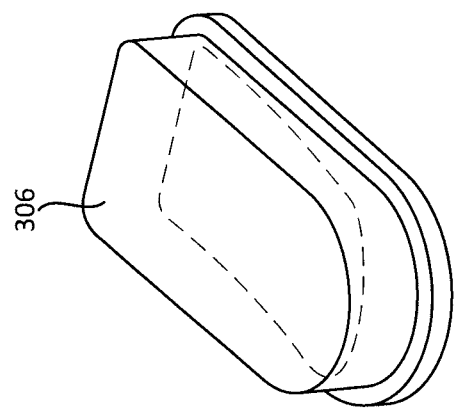
FIG.11

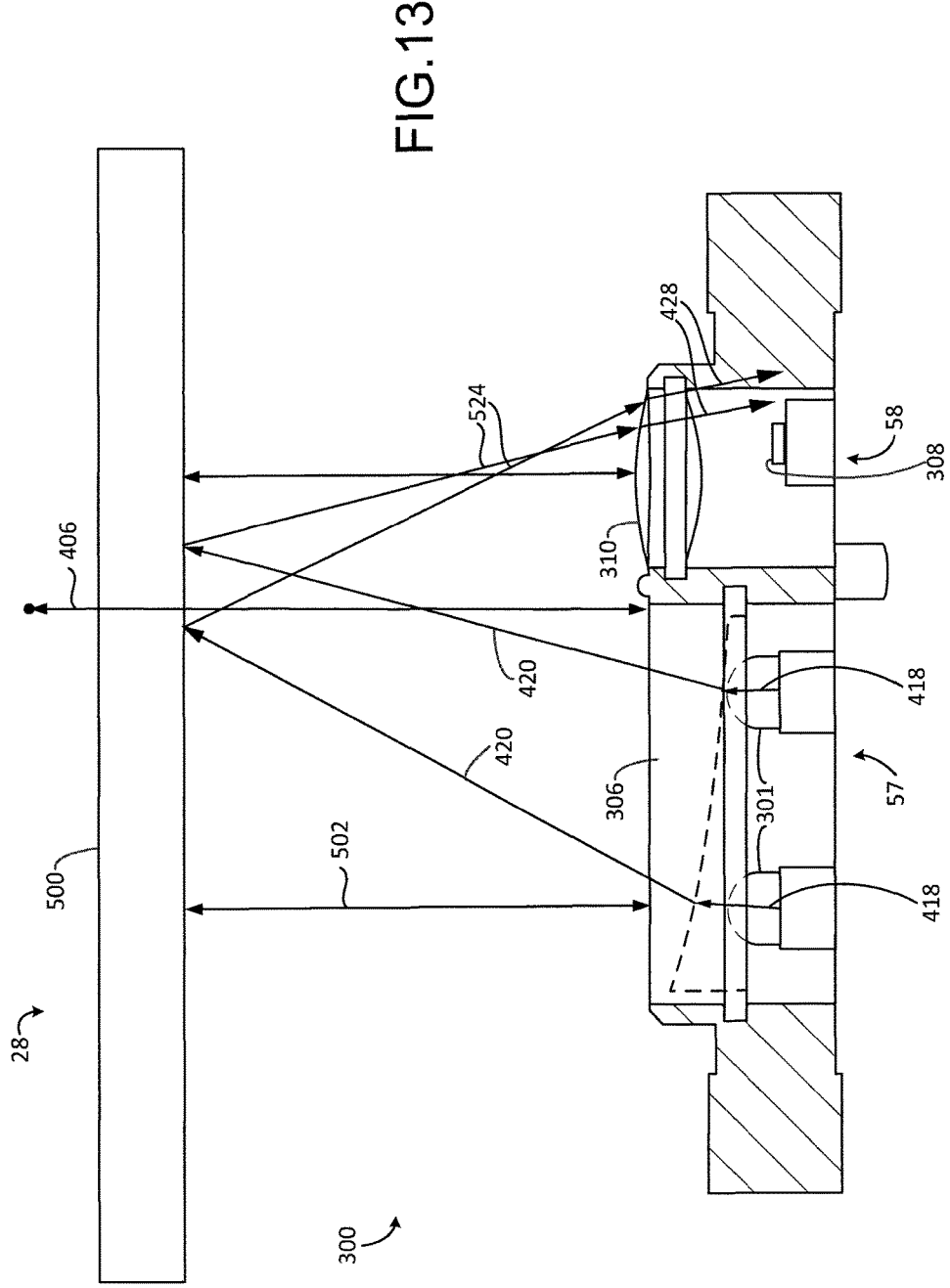

ADAPTIVE OPTICAL SENSOR FOR CONTAINER PRESENCE AND MOTION

FIELD

The present disclosure is directed to a power drive unit having the capability to detect the presence and motion of a cargo-carrying unit load device (ULD) above the power drive unit and, in particular, to a lens of the power drive unit usable to increase accuracy of ULD detection.

BACKGROUND

A variety of motorized systems for moving cargo are known. Motor driven rollers are typically employed in these systems. Aircraft often employ a series of motor driven power drive units ("PDUs") to quickly and efficiently propel cargo containers and pallets, otherwise known as unit load devices ("ULDs"), within the aircraft cargo compartment. This configuration can allow for the transportation of cargo from an external loader to an interior of the aircraft by one or more operators controlling the PDUs.

It is desirable to track the location and movement of ULDs within the aircraft. Often times, PDUs may include sensors for detecting such location and movement. However, these sensors may become saturated or otherwise incorrectly detect location and movement of ULDs.

SUMMARY

Described herein is a unit load device (ULD) sensor for detecting presence and movement of cargo within an aircraft. The ULD sensor includes a light source designed to generate light as pulses with pulse intervals between the pulses and having a source lens designed to focus the light towards a first point that is a first distance away from the source lens. The ULD sensor also includes a light receiver having a light detector designed to receive a reflection of the light and a receiver lens designed to focus the reflection of the light towards a second point that is towards the light detector and a second distance away from the receiver lens. The second distance is different than the first distance and the detected reflection of the light is usable to determine the presence and the movement of the cargo.

In any of the foregoing embodiments, the light receiver is positioned adjacent the light source in a first direction relative to the light source, the light generated by the light source is directed in a second direction relative to the light source, the second direction forming an angle that is between 50 degrees and 100 degrees relative to the first direction, and the first point is positioned in a third direction relative to the light source that is between the first direction and the second direction.

In any of the foregoing embodiments, the receiver lens has an optic center and the light detector is offset from the optic center of the receiver lens.

In any of the foregoing embodiments, the light detector is positioned a third distance from the receiver lens and the second distance is greater than the third distance.

In any of the foregoing embodiments, the light source further includes a first light emitting diode (LED) and a second LED each designed to generate the light and wherein the source lens is designed to cause the light from each of the first LED and the second LED to converge towards the first point.

In any of the foregoing embodiments, the source lens is a plano-convex lens and the receiver lens is a bioconvex lens.

In any of the foregoing embodiments, the plano-convex lens has an optic center and the source lens includes a portion of the plano-convex lens from an edge of the plano-convex lens to at least one of the optic center or a location between the optic center and the edge.

Any of the foregoing embodiments may also include a sensor housing designed to house the light source and the light receiver, wherein the light is infrared light and the sensor housing has a material that is at least one of opaque or translucent relative to the infrared light.

In any of the foregoing embodiments, the reflection of the light that reflects from the cargo positioned within at least one of less than or equal to half of the first distance of the source lens converges towards the light detector of the light receiver and the reflection of the light that reflects from an object that is farther from the source lens than the at least one of less than or equal to half of the first distance diverges away from the light detector.

Also described is a power drive unit (PDU) for moving cargo within an aircraft. The PDU includes a light source designed to generate light as pulses with pulse intervals between the pulses and having a source lens designed to focus the light towards a first point that is a first distance away from the source lens. The PDU also includes a light receiver having a light detector designed to receive a reflection of the light and a receiver lens designed to focus the reflection of the light towards a second point that is towards the light detector and a second distance away from the receiver lens. The second distance is different than the first distance. The PDU also includes a processor coupled to the light receiver and designed to determine whether the cargo is positioned on the PDU based on the reflection of the light detected by the light detector.

In any of the foregoing embodiments, the light receiver is positioned adjacent the light source in a first direction relative to the light source, the light generated by the light source is directed in a second direction relative to the light source, the second direction forming an angle that is between 50 degrees and 100 degrees relative to the first direction, and the first point is positioned in a third direction relative to the light source that is between the first direction and the second direction.

In any of the foregoing embodiments, the receiver lens has an optic center and the light detector is offset from the optic center of the receiver lens.

In any of the foregoing embodiments, the light detector is positioned a third distance from the receiver lens and the second distance is greater than the third distance.

In any of the foregoing embodiments, the light source further includes a first light emitting diode (LED) and a second LED each designed to generate the light and wherein the source lens is designed to cause the light from each of the first LED and the second LED to converge towards the first point.

In any of the foregoing embodiments, the source lens is a plano-convex lens and the receiver lens is a bioconvex lens.

In any of the foregoing embodiments, the plano-convex lens has an optic center and the source lens includes a portion of the plano-convex lens from an edge of the plano-convex lens to at least one of the optic center or a location between the optic center and the edge.

Any of the foregoing embodiments may also include a sensor housing designed to house the light source and the light receiver, wherein the light is infrared light and the sensor housing has a material that is at least one of opaque or translucent relative to the infrared light.

In any of the foregoing embodiments, the reflection of the light that reflects from the cargo positioned within at least one of less than or equal to half of the first distance of the source lens converges towards the light detector of the light receiver and the reflection of the light that reflects from an object that is farther from the source lens than the at least one of less than or equal to half of the first distance diverges away from the light detector.

Also disclosed is an aircraft. The aircraft includes a cargo deck designed to support cargo. The aircraft also includes a plurality of power drive units (PDUs) each coupled to the cargo deck. Each of the PDUs includes a light source designed to generate light as pulses with pulse intervals between the pulses and having a source lens designed to focus the light towards a first point that is a first distance away from the source lens. Each of the PDUs also includes a light receiver having a light detector designed to receive a reflection of the light and a receiver lens designed to focus the reflection of the light towards a second point that is towards the light detector and a second distance away from the receiver lens, the second distance being different than the first distance. Each of the PDUs also includes a processor coupled to the light receiver and designed to determine whether the cargo is positioned on a corresponding PDU based on the reflection of the light detected by the light detector.

In any of the foregoing embodiments, the source lens is a plano-convex lens and the receiver lens is a bioconvex lens, and the plano-convex lens has an optic center and the source lens includes a portion of the plano-convex lens from an edge of the plano-convex lens to at least one of the optic center or a location between the optic center and the edge.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 6A illustrates an ideal waveform comprising a plurality of light pulses and a plurality of light intervals, in accordance with various embodiments;

FIG. 6B illustrates an ideal output in response to a lack of cargo on the PDU of FIG. 3, in accordance with various embodiments;

FIG. 8A illustrates an ideal waveform including a plurality of light pulses and a plurality of light intervals, in accordance with various embodiments;

FIG. 8B illustrates two received pulses representative of stationary cargo and two additional received pulses representative of moving cargo, in accordance with various embodiments;

FIG. 11 is a perspective view of a source lens and a receiver lens of the ULD sensor of FIG. 10, in accordance with various embodiments;

FIG. 13 is a cross-sectional view of the ULD sensor of FIG. 10 illustrating operation of the ULD sensor in response to an object being outside of a predetermined range of the ULD sensor, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
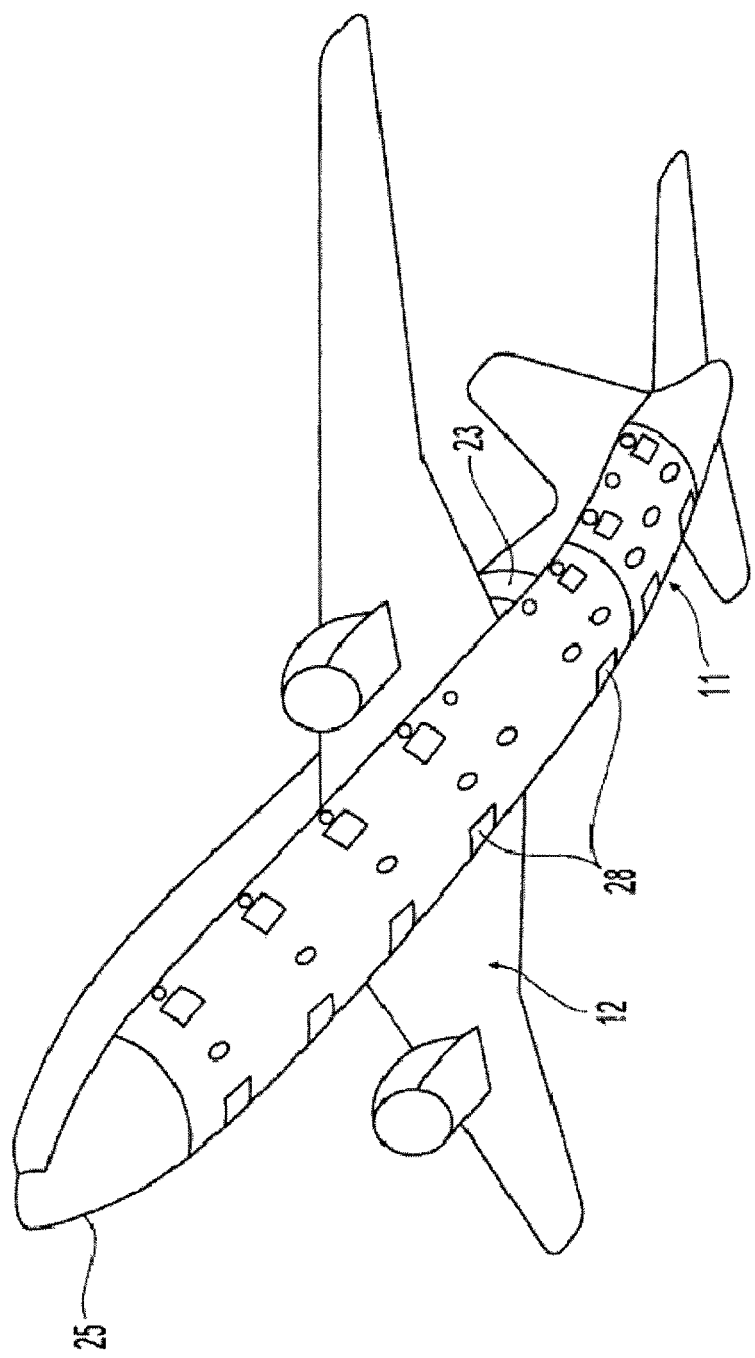
FIG. 1 illustrates an underside of an aircraft, in accordance with various embodiments.
Figure 2:
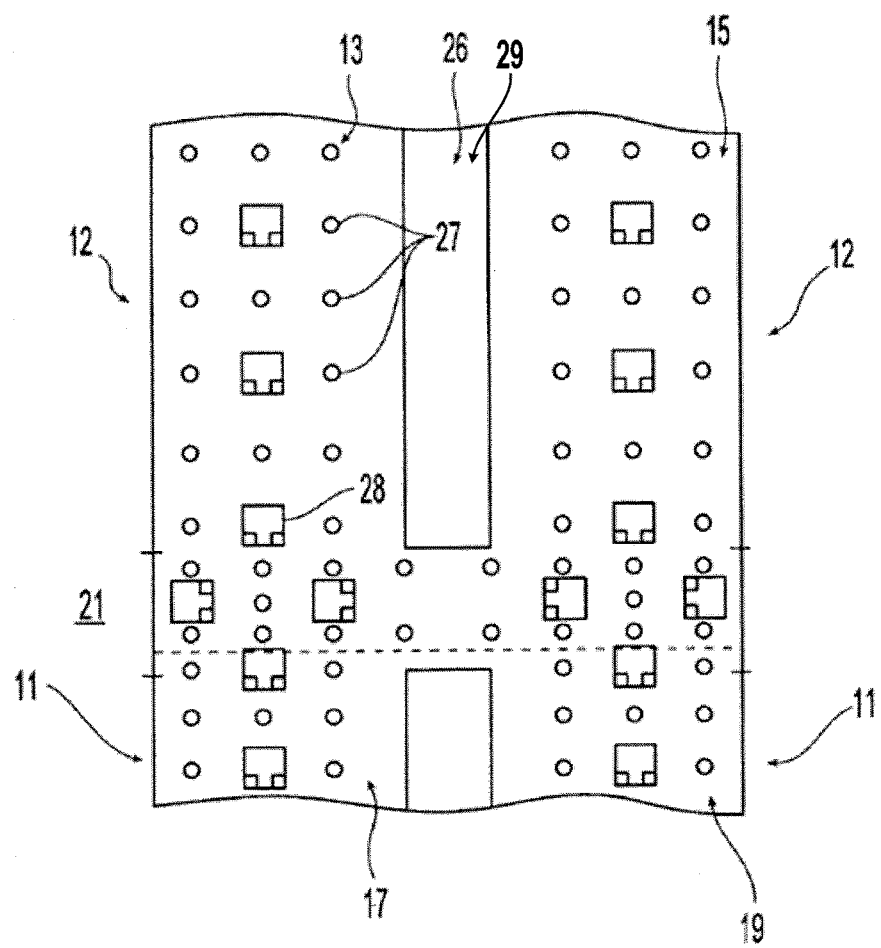
FIG. 2 illustrates an aircraft cargo deck, in accordance with various embodiments.

FIG. 1 illustrates an underside of an aircraft 25 and FIG. 2 illustrates an aircraft cargo deck 29 that can be used to implement various embodiments of the present disclosure. A generally H-shaped conveyance surface 26 forms a deck of an aircraft, adjacent a cargo bay loading door 23. However, there are many other aircraft cargo deck configurations to which the embodiments of the disclosure can be implemented. For example, various aircraft, particularly those designed primarily for the transportation of cargo without passengers, have the upper passenger deck removed and an additional larger cargo deck installed. Other aircraft may have three or more parallel longitudinal tracks rather than the H-shape shown in FIG. 2.

The cargo compartment includes a cargo loading system comprising a plurality of freely rotating conveyance rollers 27 mounted in the cargo deck to define the conveyance plane. Cargo loaded onto the aircraft cargo deck can be moved manually throughout the cargo bay upon the freely rotating conveyance rollers. However, it is desirable to electro-mechanically propel the cargo with minimal or no manual assistance. In that regard, the H-shaped cargo surface includes a number of PDUs 28 that provide a mechanism upon which cargo is propelled over the conveyance rollers 27. Each PDU 28 typically includes a drive roller element which can be raised from a lowered position beneath the cargo deck to an elevated position. These PDUs are referred to as "self-lift" PDUs. In the elevated position, the drive roller element contacts and drives the overlying cargo that rides on the conveyance rollers. Other types of PDUs, which can also be used as embodiments of the present disclosure, are above the conveyor plane all the time and held up by a spring. These PDUs are referred to as "spring-lift" PDUs.

In the longitudinal direction, the H-shaped conveyance surface 26 includes a left track and a right track along which cargo is to be stowed in parallel columns during flight. In the transverse direction, the cargo deck is also separated into a tail (or "aft") section 11 and a forward section 12. Thus, the left and right tracks are divided into four sections, two forward sections 13 and 15 and two aft sections 17 and 19. In addition to the four sections, there is an additional path 21 between both tracks at the cargo bay loading door 23. This additional path 21 divides the cargo bay between the forward section 12 and aft section 11. This path is used to move cargo into and out the aircraft, and also to transfer cargo between the left and right storage tracks.

In various embodiments, a human operator manipulates control elements to selectively and electrically energize PDUs 28 in each of the five aforementioned sections 13, 15, 17, 19 and 21. Typically, these controls are mounted in an operator interface unit. The control elements may be mounted on a wall or other structure within the cargo bay or may be portable, e.g., the controls may be in a hand held pendant. These controls will typically have an on/off switch and a joystick which, depending on the direction pushed, will energize a set of PDUs 28, causing groups of drive roller elements to be elevated (if not already elevated) and rotated in one of two possible directions (i.e., forward or reverse). A section of PDUs will remain energized as long as the joystick is held in a corresponding position. In response to release of the joystick, the selected set of PDUs is de-energized. In the case of self-lifting PDUs, the drive roller elements are returned to their retracted position below the plane of the conveyance rollers 27; in the case of spring-lift PDUs, the PDUs remain biased in the upward position and brakes are applied to hold the cargo containers in place.

Figure 3:
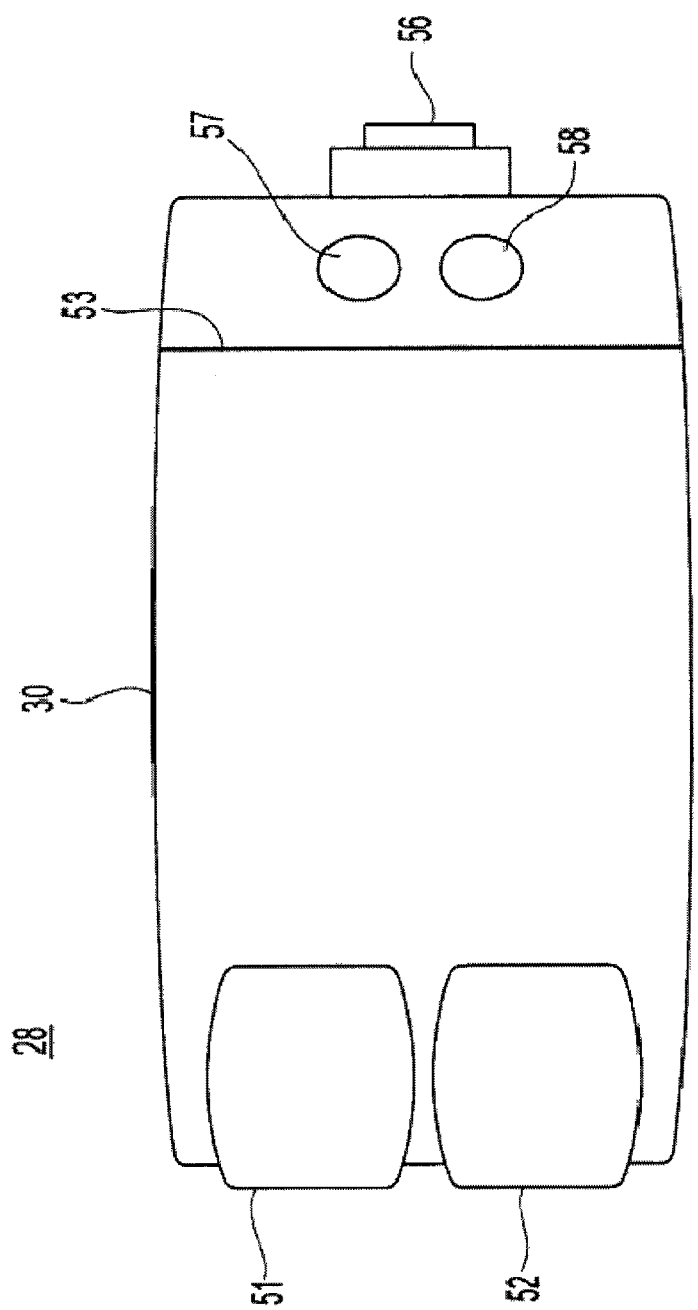
FIG. 3 is a top view of a PDU, in accordance with various embodiments.

FIG. 3 is a top view of a PDU 28 in accordance with various embodiments of the present disclosure. PDU 28 includes a housing 30 which incorporates a pair of wheels 51 and 52 that function as drive roller elements. Wheels 51 and 52 are coupled to a drive shaft. PDU 28 further includes motor and gear assemblies and other related components for turning and/or raising wheels 51 and 52 so that wheels 51 and 52 are positioned above the cargo deck and are able to contact the bottom of a ULD.

PDU 28 further includes an electronics cavity that is separated from the rest of the PDU by a wall 53 for housing the necessary electronics (disclosed in more detail below), and includes an electrical connector 56 for coupling the electronics to a power source and a control source.

PDU 28 further includes a light source 57, such as an infrared light ("IR") transmitter having a light emitting diode ("LED"), for emitting infrared light. PDU 28 further includes a light receiver 58, such as an IR receiver having a photo diode or photo transistor and perhaps other circuitry such as signal amplifiers, automatic gain control, bandpass filters and the like, for detecting the presence of infrared light. In further embodiments, other types of light besides IR can be used. In response to the light source 57 emitting light of a particular center wavelength (e.g., infrared), the light receiver 58 may be selected based on its response characteristics in the relevant wavelength, and may be accompanied by appropriate optical filters, lenses and the like.

Figure 4:
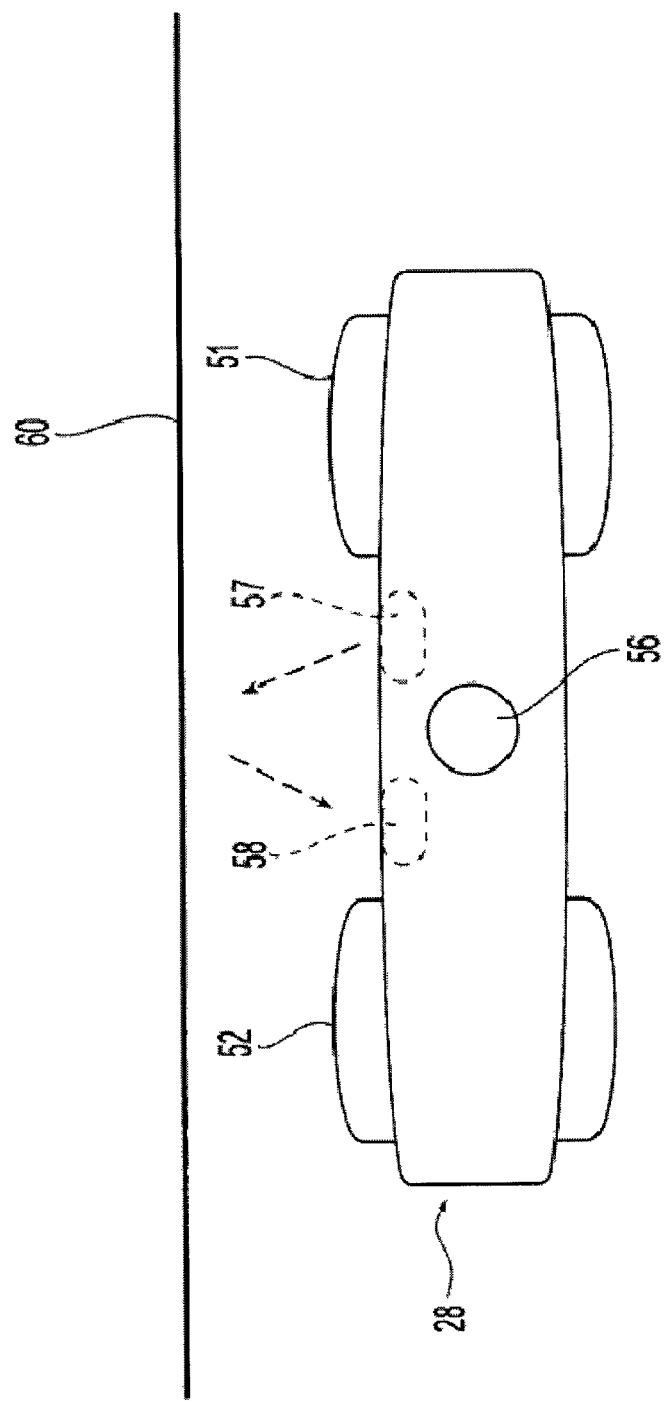
FIG. 4 is an end view of the PDU, in accordance with various embodiments.

FIG. 4 is an end view of PDU 28 in accordance with various embodiments of the present disclosure, and illustrates the relationship of PDU 28 with the bottom surface 60 of a ULD that is passing over and being propelled by PDU 28. The light source 57 emits light that bounces off the bottom surface 60 (assuming a ULD is present) and is reflected back to light receiver 58 where it is processed by the electronics of PDU 28.

Figure 5:
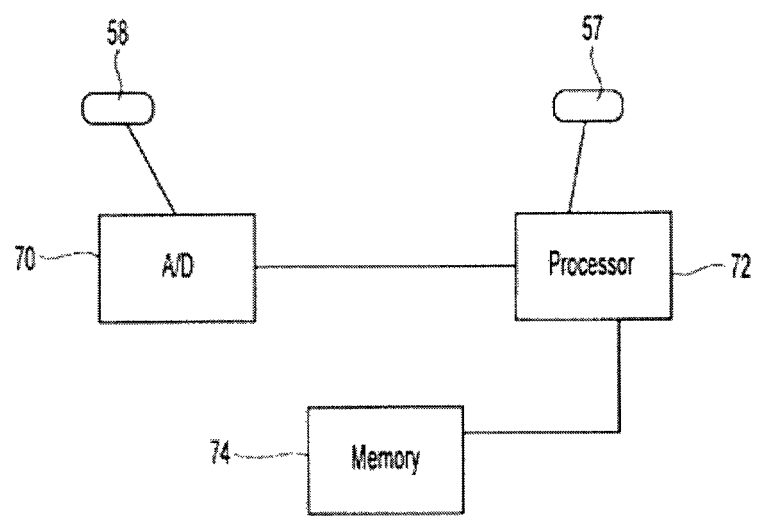
FIG. 5 is a block diagram illustrating components of the PDU of FIG. 3, in accordance with various embodiments.

FIG. 5 is a block diagram of the ULD sensor and scrub sensor electronics of PDU 28 in accordance with one embodiment of the present disclosure. Coupled to light receiver 58 is an analog to digital ("A/D") converter 70 that takes an analog input from the light receiver 58 and converts it to a digital value representative of an instantaneous intensity of light. Coupled to A/D converter 70 is a processor 72 and memory 74. Processor 72 may be, for example, a computer based-system having a processor and memory. A processor may thus include one or more processors and one or more tangible, non-transitory memories and be capable of implementing logic. The processor can be a general purpose processor, a digital signal processor (DSP), an application specific integrated circuit (ASIC), a field programmable gate array (FPGA), a graphical processing unit (GPU), or other programmable logic device, discrete gate or transistor logic, discrete hardware components, or any combination thereof. Memory 74 may be any non-transitory memory capable of storing data. For example, memory 74 may store instructions to be executed by processor 72. In various embodiments, processor 72 may include A/D converter 70 and/or memory 74. Light source 57 is coupled to an output of processor 72. In various embodiments, a power driver is included between processor 72 and the light source 57.

One or more processor-adjustable variable resistor may be coupled to processor 72 and light receiver 58. The variable resistor is used to set the sensitivity of A/D converter 70, which selects the window of light that the sensor will measure (i.e., the minimum strength of light that will be detected and the greatest strength of light that can be measured before the A/D output reaches its maximum value). Processor 72 may control the variable resistor to select the window of light to be measured. In various embodiments, processor 72 may further control an amount of light generated by light source 57. Processor 72 may also determine whether cargo is positioned on PDU 28 and/or whether cargo is moving or stationary relative to PDU 28 based on the light measured by light receiver 58.

In various embodiments, the A/D converter 70 is a 10-bit A/D converter, although A/D converters of other bit resolutions may be used instead. In various embodiments, the A/D converter 70 samples the time-varying light intensity at a rate of 200 samples/second, or at 5 millisecond intervals. Thus, for a one-quarter second pulse, a time series of 50 digital samples are taken, and these are provided to the processor 72 for further calculations. It is understood that not all 50 samples may be used due to start-up transients in the first few digital samples. It is further understood that other sampling rates may be used, depending on the A/D converter 70 and processor 72 speed.

FIG. 6A shows an example of an ideal output waveform 202 emitted by the light source 57. The output waveform 202 comprises a train of light pulses 204 with a nominal pulse height represented by a voltage $V_0$. In the embodiment shown, these pulses comprise square waves with an ON period 206 of W1, an OFF period 208 of W2, and a total period of W3=W1+W2. In various embodiments W1=W2 for a 50% ON-time duty cycle, though it is possible to have other duty cycles, as well.

FIG. 6B shows an ideal waveform 222 output by the light receiver 58 (i.e., the received light) in response to no ULD covering the PDU. In the absence of an object, e.g., an ULD, covering the PDU 28, the emitted light pulses 240 are not reflected off the bottom surface of that object, and so no light energy (i.e., 0 volts) should be received at the light receiver 58, whose output is therefore flat. In reality, however, there may be a small amount of ambient light of the appropriate wavelength, such as 'bleed' from the light source 57 that impinges on the light receiver 58, thus resulting in minimal received light energy. However, this minimal received light energy is generally below a threshold value and therefore is ignored by the processor 72.

Figure 7A:
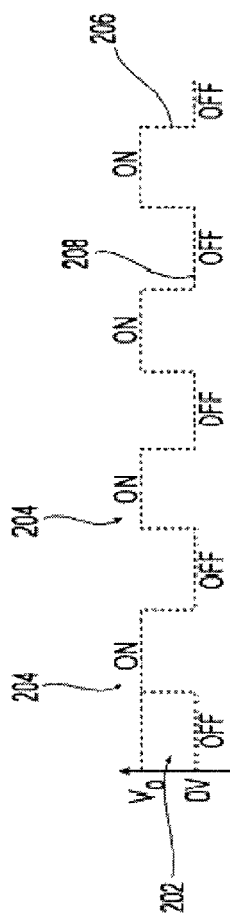
FIG. 7A illustrates an ideal waveform comprising a plurality of light pulses and a plurality of light intervals, in accordance with various embodiments.
Figure 7B:
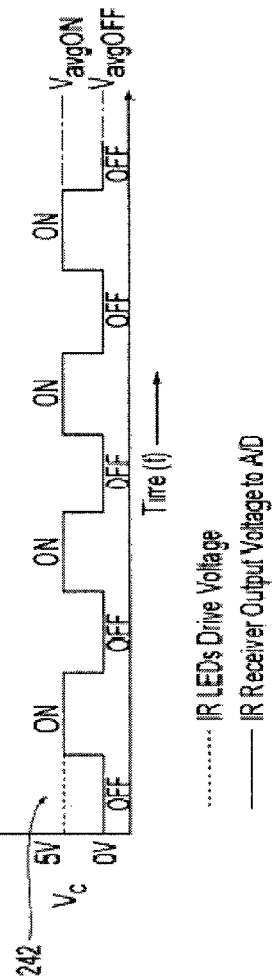
FIG. 7B illustrates an ideal output in response to cargo being positioned on the PDU of FIG. 3, in accordance with various embodiments.

FIG. 7A shows the same ideal output waveform 202 seen in FIG. 6 while FIG. 7B shows, for comparison, an ideal waveform 242 output by the light receiver 58 in response to a stationary object covering the PDU 28. In response to a stationary object such as an ULD covering the PDU 28, the emitted light pulses 240 are reflected off the bottom surface of that object and the reflected light energy is received at the light receiver 58. The output of light receiver 58 is representative of the time-varying intensity of the reflected light. However, since the object is stationary, ideally, the detector output will track the emitted waveform, with the intensity of detected light on the output side of light receiver 58 being represented by a voltage value Vc.

FIGS. 8A and 8B also correspond to the situation in which an ULD covers the PDU 28, but shows more realistic, non-ideal output. FIG. 8A shows the same ideal output waveform 202 seen in FIGS. 6 and 7. FIG. 8B shows a waveform 260 comprising four pulses of detected light. In this instance, the ULD is initially stationary during the first two pulses 262, 264, and then is in motion during the last two pulses 266, 268.

Figure 8C:
FIG. 8C illustrates a detailed view of a pulse of FIG. 8B representing the stationary cargo, in accordance with various embodiments.

In response to the ULD being stationary, the detected pulses 262, 264 have intensity values that are all confined in a narrow band defined 270 between $V_{LO}$ and $V_{HI}$. This is because the output waveform 202 impinges on the same location on the underside of the ULD, and so the reflected light is substantially unaffected by variations in the surface of the underside of the ULD. FIG. 8C shows a magnified view of the detected pulse 264 and shows that all intensity values within the pulse 264 are between the lower limit 270L and the upper limit 270H of the band.

Figure 8D:
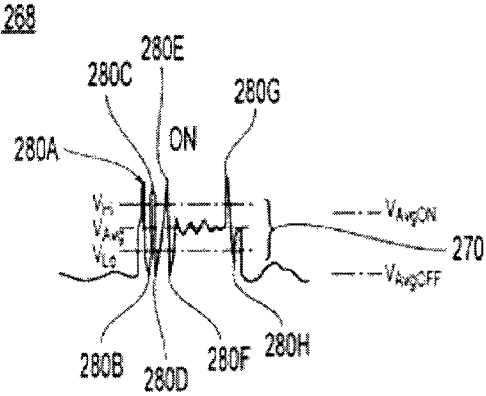
FIG. 8D illustrates a detailed view of a pulse of FIG. 8B representing the moving cargo, in accordance with various embodiments.

In contrast, in response to the ULD being in motion, the detected pulses 266, 268 have intensity values that go outside this band 270 from time to time. This happens because as the ULD moves, different portions of its underside pass over the PDU 28, and variations in the surface of the underside cause corresponding variations the instantaneous intensity of the reflected pulses. Generally speaking, at least a portion of these instantaneous sample values go outside the band 270. FIG. 8D shows a magnified view of the detected pulse 267 and shows that a portion of received intensity values, designated 280A-H are outside the band 270. Digital sample values which fall outside the band 270 are referred to as "spikes".

Certain fluctuations in the environment can affect the light detected by light receiver 58. For example, an underside of a ULD may have a greater reflectivity than other ULDs. This relatively great reflectivity may cause a relative increase in light received by light receiver 58. This relative increase in light may cause light receiver 58 to become saturated such that light receiver 58 may not be capable of distinguishing between samples that are within the band 270 and samples that go outside the band 270. As another example, an operator with a reflective clipboard may walk past PDU 28 in response to no ULD being positioned on PDU 28. Light from light source 57 may reflect off the reflective clipboard and be received by light receiver 58, resulting in a false determination by processor 72 that a ULD is positioned on PDU 28. In that regard, PDU 28 may be designed to adjust an intensity of light generated by light source 57 based on light detected by light receiver 58.

Figure 9:
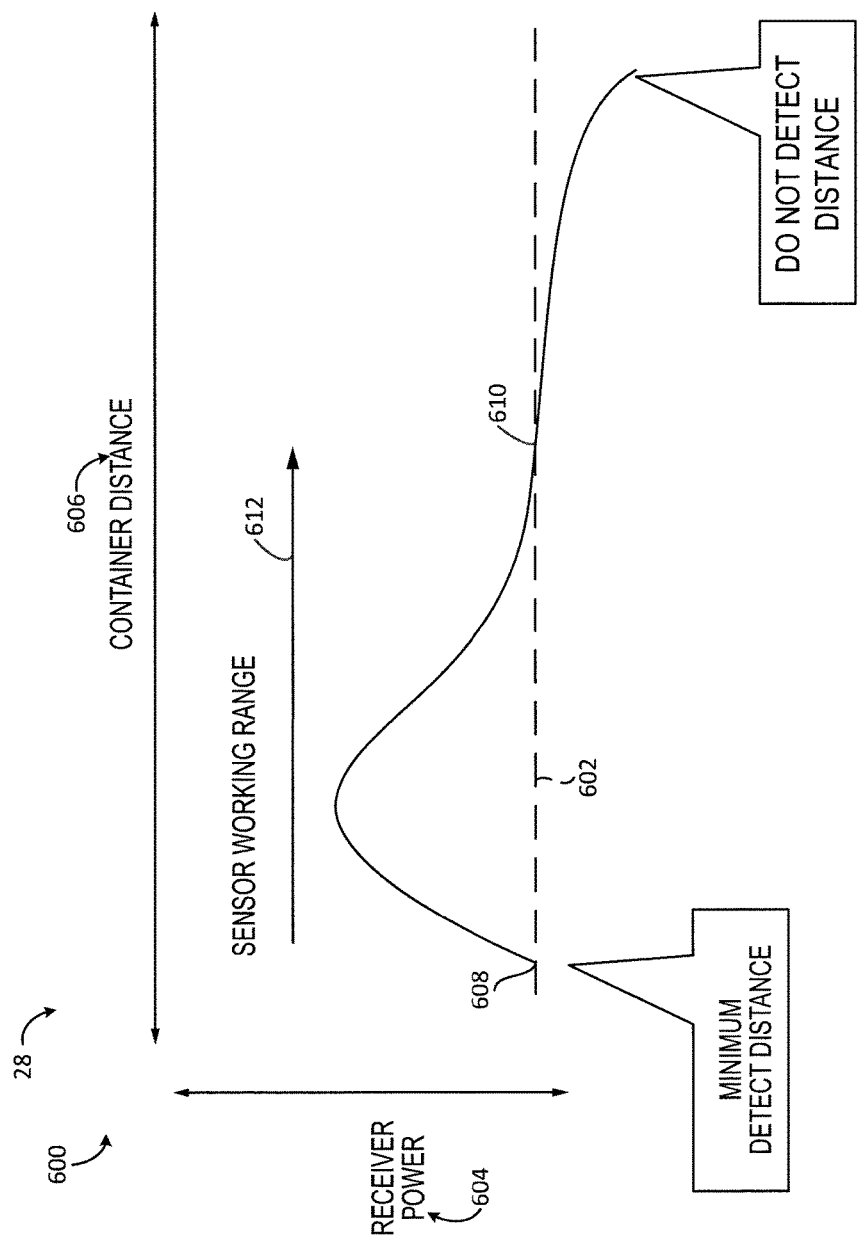
FIG. 9 is a chart illustrating a relationship between a distance from a PDU to an object and intensity of reflected light received by a light receiver of the PDU and how the relationship corresponds to cargo detection, in accordance with various embodiments.

It is desirable for PDU 28 to determine that cargo is present on PDU 28 in response to an object being within a predetermined distance of light receiver 58 and to determine that cargo is not present on PDU 28 in response to an object being positioned farther from the light receiver 58 than the predetermined distance. In various embodiments, it may be desirable for PDU 28 to determine that cargo is not present on PDU 28 in response to an object being positioned nearer to PDU 28 than a second predetermined distance. This property is illustrated in FIG. 9. In particular, FIG. 9 is a graph 600 illustrating a relationship between a distance from PDU 28 to a container (container distance 606) and intensity of the signal received by light source 57 (receiver power like), and how such relationship corresponds to object detection.

In various embodiments, it may be undesirable for PDU 28 to detect presence of an object that is less than a minimum distance 608 from PDU 28. Thus, it is desirable for the receiver power 604 to be less than a threshold receiver power 602 in response to the object being less than the minimum distance 608 from PDU 28. In response to receiver power 604 being less than the threshold receiver power 602, processor 72 of FIG. 5 may determine that no cargo is present on PDU 28.

Likewise, it may be undesirable for PDU 28 to detect presence of an object that is greater than a maximum distance 610 from PDU 28. Thus, it is desirable for the receiver power 604 to be less than the threshold receiver power 602 in response to the object being greater than the maximum distance 610 from PDU 28. Again, in response to receiver power 604 being less than the threshold receiver power 602, processor 72 of FIG. 5 may determine that no cargo is present on PDU 28. Thus, processor 72 of FIG. 5 may determine that cargo is present on PDU 28 in response to an object being positioned within a distance range 612 corresponding to a range of distances between PDU 28 and an object.

Figure 10:
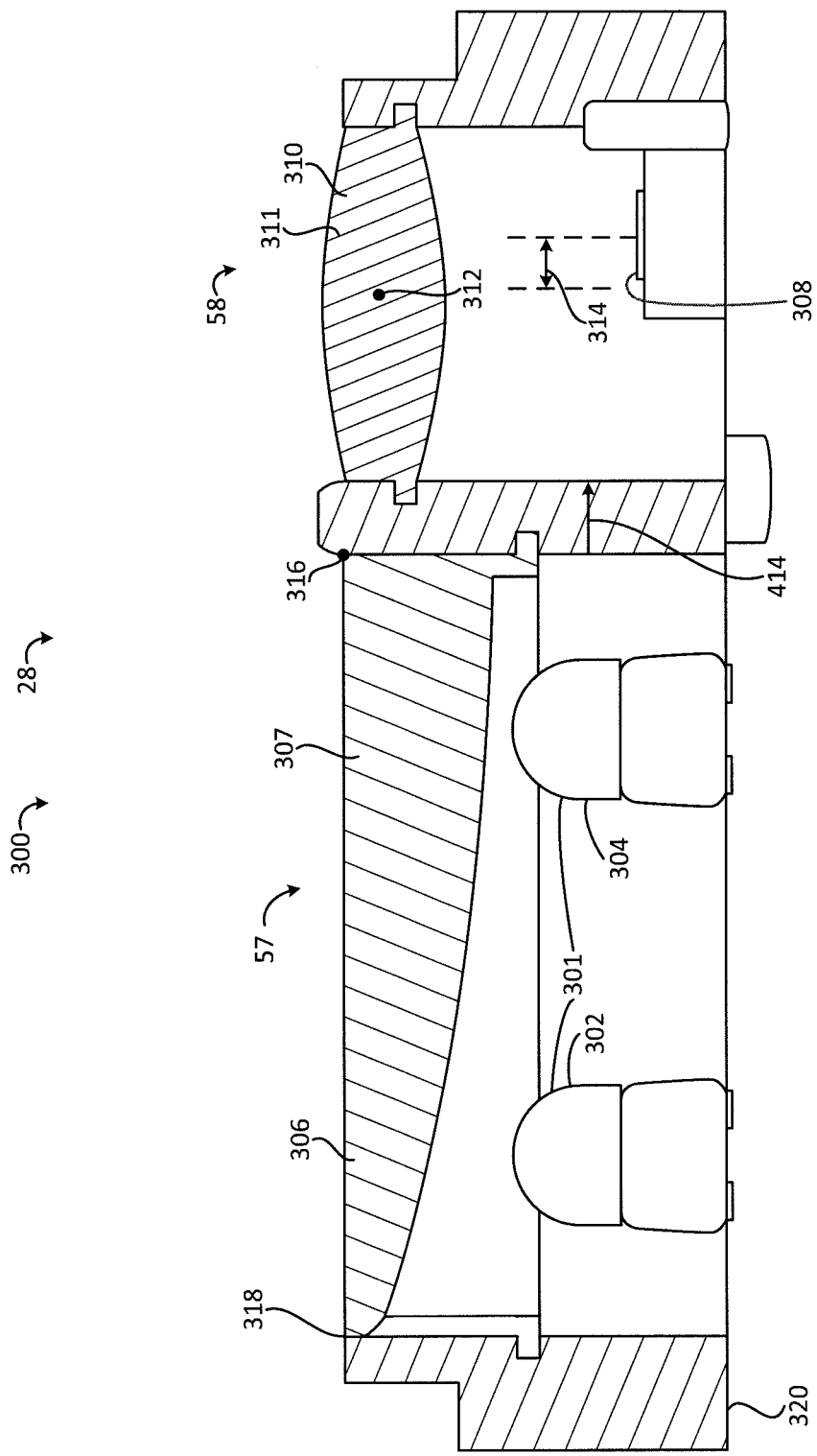
FIG. 10 is a cross-sectional view of a ULD sensor illustrating various features of the ULD sensor, in accordance with various embodiments.

Turning to FIGS. 10 and 11, a ULD sensor 300 of PDU 28 is designed to facilitate detection of objects within the distance range 612 of FIG. 9 and to reduce the likelihood of processor 72 of FIG. 5 determining that cargo is present in response to an object being positioned out of the distance range 612. As described above, ULD sensor 300 includes light source 57 and light receiver 58.

Light source 57 includes one or more LEDs 301 including a first LED 302 and a second LED 304. Light source 57 further includes a source lens 306. Source lens 306 includes a portion (i.e., some) of a plano-convex lens 307. In particular, source lens 306 has an optic center 316 and an edge 318. In various embodiments, source lens 306 may include a portion of plano-convex lens 307 that is between edge 318 and optic center 316, or may include a portion of plano-convex lens 307 that is between edge 318 and a location 317 between edge 318 and optic center 316. In various embodiments, source lens 306 may include a portion of plano-convex lens 307 that is between optic center 316 and location 317, or a portion of plano-convex lens 307 that is between location 317 and another location between optic center 316 and edge 318.

Light receiver 58 includes a light detector 308 and a receiver lens 310. Light detector 308 detects light reflected off an object that was originally transmitted by one or both LEDs 301. Thus, in order for light to propagate from one or more LEDs 301 to light detector 308, light must first pass through source lens 306, reflect from an object, and pass through receiver lens 310. Receiver lens 310 may include a bioconvex lens 311 and may have an optic center 312.

Light receiver 58 may be positioned adjacent light source 57 in a first direction 414 relative to light source 57. In various embodiments, light detector 308 may be offset 314 from optic center 312 along first direction 414.

Figure 12:
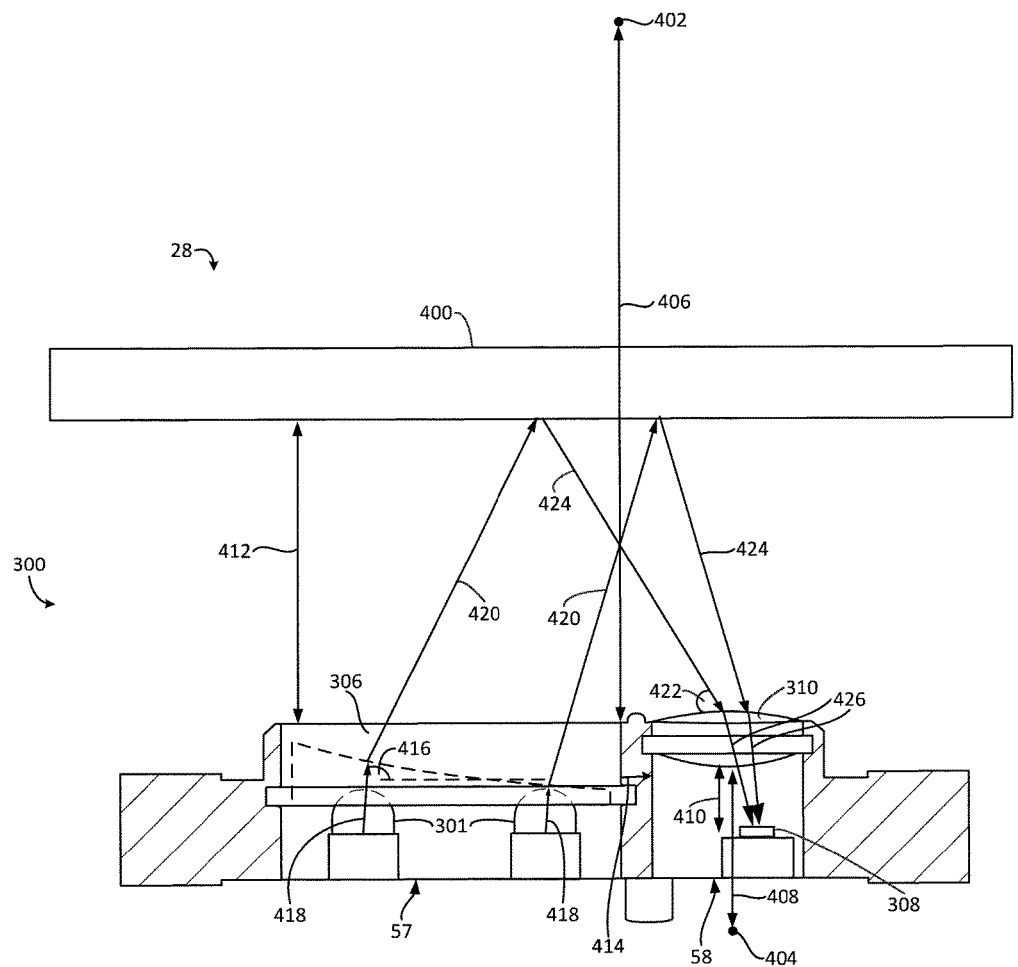
FIG. 12 is a cross-sectional view of the ULD sensor of FIG. 10 illustrating operation of the ULD sensor in response to an object being within a predetermined range of the ULD sensor, in accordance with various embodiments.

With reference to FIGS. 10 and 12, source lens 306 may focus light from LEDs 301 towards a first point 402. Likewise, receiver lens 310 may focus light towards a second point 404. LEDs 301 may each output light in a second direction 418 relative to light source 57. Second direction 418 may form an angle 416 with first direction 414. In various embodiments, angle 416 may be between 50 degrees and 100 degrees relative to first direction 414. The first point 402 may be oriented in a third direction 420 that is oriented between first direction 414 and the second direction 418.

Due to source lens 306 focusing a light towards first point 402, a reflection 424 of light may be received by receiver lens 310 at an angle 422. Stated differently, reflection 424 may be considered a vector with a first component along first direction 414 and a second component along second direction 418. Due to reflection 424 having the component along first direction 414, light received by receiver lens 310 may be output by receiver lens 310 towards a location (the location of light detector 308) that is offset from optic center 312. Thus, offset 314 improves the accuracy of light detection by light detector 308.

With renewed reference to FIG. 12, first point 402 corresponding to the focal point of source lens 306 may be positioned a first distance 406 from source lens 306. In various embodiments, first distance 406 may be between 1 inch (25.4 millimeters (mm)) and 12 inches (305 mm), between 1 inch (25.4 mm) and 6 inches (152 mm), or between 2 inches (50.8 mm) and 4 inches (101.6 mm).

Source lens 306 may be selected such that light reflected off an object within the distance range 612 of FIG. 9 is focused towards receiver lens 310. In that regard, cargo 400 may be positioned an object distance 412 from ULD sensor 300. Object distance 412 may be within the distance range 612 of FIG. 9 and may be less than or equal to one half of the first distance 406. As shown, reflection 424 from each of the LEDs 301 may converge towards receiver lens 310.

Turning to FIG. 13, another object 500 may be positioned a second object distance 502 from source lens 306. Second object distance 502 may be greater than one half of first distance 406. In that regard, reflection 524 reflecting off object 500 may diverge as it approaches receiver lens 310. The divergence of reflection 524 causes some or all the reflection 524 to reach a location other than light detector 308. Thus, object 500 may be outside of the distance range 612 of FIG. 9. Due to the relatively small amount of reflection 524 received by light detector 308, processor 72 of FIG. 5 may determine that no cargo is present on PDU 28.

Referring now to FIGS. 12 and 13, the second point 404 corresponding to the focal point of receiver lens 310 may be positioned a second distance 408 from receiver lens 310. In various embodiments, second distance 408 may be between 0.1 inches (2.54 mm) and 1 inch (25.4 mm), between 0.2 inches (5.08 mm) and 0.8 inches (20.3 mm), or between 0.3 inches (7.62 mm) and 0.6 inches (15.2 mm).

In various embodiments, first distance 406 from source lens 306 to first point 402 may be greater than second distance 408 from receiver lens 310 to second point 404. Such a difference in focal points between source lens 306 and receiver lens 310 allows each lens to be optimized for their corresponding purpose.

As described above, characteristics of source lens 306 may be selected to optimize detection of objects that are within a predetermined distance of source lens 306. Characteristics of receiver lens 310 may be selected to focus light reflected off an object towards light detector 308. As shown, reflection 424 reflected from cargo 400 reaches receiver lens 310. Receiver lens 310 then redirects the light towards light detector 308 as shown by arrows 426. However, due to the divergence of reflection 524, reflection 524 reflected from object 500 reaches receiver lens 310 at a different location than reflection 424. Thus, receiver lens 310 may not focus the light towards light detector 308 and, thus, the light may be oriented away from the light detector 308 as shown by arrows 428.

Light detector 308 may be positioned a third distance 410 from receiver lens 310. In various embodiments, third distance 410 may be less than second distance 408. Stated differently, second point 404 (the focal point of receiver lens 310) may be farther from receiver lens 310 than light detector 308. Thus, light received by receiver lens 310 may be focused towards light detector 308. It may be undesirable for the focal point of receiver lens 310 to be at the location of light detector 308 as such a configuration may not provide sufficient detection capabilities of light reflected from an uneven surface of cargo.

Returning reference to FIG. 10, ULD sensor 300 may further include a sensor housing 324 for containing components of ULD sensor 300 and maintaining relative location of the components. Sensor housing 320 may include any material, such as a plastic, nylon, polycarbonate, and other competent material, or the like. It is desirable for sensor housing 320 to be optically translucent (i.e., 30 percent or less of light in the desirable wavelength may propagate through sensor housing 320) or opaque relative to the light emitted by LEDs 301. For example, LEDs 301 may emit light having a wavelength within the infrared band (wavelengths between 0.028 thousandths of an inch (mils, 700 nanometers (NM)) and 39.4 mils (1 mm). Such translucency or opaqueness reduces the likelihood of light generated by LEDs 301 propagating through sensor housing 320 directly to light detector 308.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is proposed to be claimed is:

1. A unit load device (ULD) sensor for detecting presence and movement of cargo within an aircraft, comprising:
    a light source configured to generate light as pulses with pulse intervals between the pulses and having a source lens configured to focus the light towards a first point that is a first distance away from the source lens; and
    a light receiver having a light detector configured to receive a reflection of the light and a receiver lens having an optic center and configured to focus the reflection of the light towards a second point that is towards the light detector and a second distance away from the receiver lens, the second distance being different than the first distance, the detected reflection of the light being usable to determine the presence and the movement of the cargo, and the light detector being offset from the optic center of the receiver lens.

2. The ULD sensor of claim 1, wherein:
    the light receiver is positioned adjacent the light source in a first direction relative to the light source;
    the light generated by the light source is directed in a second direction relative to the light source, the second direction forming an angle that is between 50 degrees and 100 degrees relative to the first direction; and
    the first point is positioned in a third direction relative to the light source that is between the first direction and the second direction.

3. The ULD sensor of claim 1, wherein the light detector is positioned a third distance from the receiver lens and the second distance is greater than the third distance.

4. The ULD sensor of claim 1, wherein the light source further includes a first light emitting diode (LED) and a second LED each configured to generate the light and wherein the source lens is configured to cause the light from each of the first LED and the second LED to converge towards the first point.

5. The ULD sensor of claim 1, wherein the source lens is a plano-convex lens and the receiver lens is a bioconvex lens.

6. The ULD sensor of claim 5, wherein the plano-convex lens has an optic center and the source lens includes a portion of an entire plano-convex lens, the portion extending from an edge of the entire plano-convex lens to at least one of the optic center or a location between the optic center and the edge.

7. The ULD sensor of claim 1, further comprising a sensor housing configured to house the light source and the light receiver, wherein the light is infrared light and the sensor housing has a material that is at least one of opaque or translucent relative to the infrared light.

8. The ULD sensor of claim 1, wherein the reflection of the light that reflects from the cargo positioned within at least one of less than or equal to half of the first distance of the source lens converges towards the light detector of the light receiver and the reflection of the light that reflects from an object that is farther from the source lens than the at least one of less than or equal to half of the first distance diverges away from the light detector.

9. A power drive unit (PDU) for moving cargo within an aircraft, comprising:
    a light source configured to generate light as pulses with pulse intervals between the pulses and having a source lens configured to focus the light towards a first point that is a first distance away from the source lens;
    a light receiver having a light detector configured to receive a reflection of the light and a receiver lens having an optic center and configured to focus the reflection of the light towards a second point that is towards the light detector and a second distance away from the receiver lens, the second distance being different than the first distance, and the light detector being offset from the optic center of the receiver lens; and
    a processor coupled to the light receiver and configured to determine whether the cargo is positioned on the PDU based on the reflection of the light detected by the light detector.

10. The PDU of claim 9, wherein:
    the light receiver is positioned adjacent the light source in a first direction relative to the light source;

the light generated by the light source is directed in a second direction relative to the light source, the second direction forming an angle that is between 50 degrees and 100 degrees relative to the first direction; and the first point is positioned in a third direction relative to the light source that is between the first direction and the second direction.

11. The PDU of claim 9, wherein the light detector is positioned a third distance from the receiver lens and the second distance is greater than the third distance.

12. The PDU of claim 9, wherein the light source further includes a first light emitting diode (LED) and a second LED each configured to generate the light and wherein the source lens is configured to cause the light from each of the first LED and the second LED to converge towards the first point.

13. The PDU of claim 9, wherein the source lens is a plano-convex lens and the receiver lens is a bioconvex lens.

14. The PDU of claim 13, wherein the plano-convex lens has an optic center and the source lens includes a portion of an entire plano-convex lens, the portion extending from an edge of the entire plano-convex lens to at least one of the optic center or a location between the optic center and the edge.

15. The PDU of claim 9, further comprising a sensor housing configured to house the light source and the light receiver, wherein the light is infrared light and the sensor housing has a material that is at least one of opaque or translucent relative to the infrared light.

16. The PDU of claim 9, wherein the reflection of the light that reflects from the cargo positioned within at least one of less than or equal to half of the first distance of the source lens converges towards the light detector of the light receiver and the reflection of the light that reflects from an object that is farther from the source lens than the at least one of less than or equal to half of the first distance diverges away from the light detector.

17. An aircraft, comprising:
a cargo deck configured to support cargo; and
a plurality of power drive units (PDUs) each coupled to the cargo deck and having:
a light source configured to generate light as pulses with pulse intervals between the pulses and having a source lens configured to focus the light towards a first point that is a first distance away from the source lens,
a light receiver having a light detector configured to receive a reflection of the light and a receiver lens having an optic center and configured to focus the reflection of the light towards a second point that is towards the light detector and a second distance away from the receiver lens, the second distance being different than the first distance, and the light detector being offset from the optic center of the receiver lens, and
a processor coupled to the light receiver and configured to determine whether the cargo is positioned on a corresponding PDU based on the reflection of the light detected by the light detector.

18. The aircraft of claim 17, wherein the receiver lens is a bioconvex lens, and the source lens includes a portion of an entire plano-convex lens having an optic center, the portion extending from an edge of the entire plano-convex lens to at least one of the optic center or a location between the optic center and the edge.

* * * * *